United States Patent [19]
Okaizumi et al.

[11] Patent Number: 6,010,730
[45] Date of Patent: Jan. 4, 2000

[54] METHOD AND APPARATUS FOR WINDING UP A SHEET OF DOUGH

[75] Inventors: Hiroyuki Okaizumi; Nobuyoshi Kuroo; Takao Niibe, all of Utsunomiya, Japan

[73] Assignee: Rheon Automatic Machinery Co., Ltd., Utsunomiya, Japan

[21] Appl. No.: 09/023,676

[22] Filed: Feb. 13, 1998

[30] Foreign Application Priority Data

Feb. 18, 1997 [JP] Japan .................................. 9-051055

[51] Int. Cl.[7] ................................ A21C 3/00; A23P 1/00
[52] U.S. Cl. ..................... 426/501; 425/364 R; 425/373; 425/374; 426/500
[58] Field of Search ..................... 426/500, 501, 426/496; 425/364 R, 373, 374

[56] References Cited

U.S. PATENT DOCUMENTS

| | | | |
|---|---|---|---|
| 4,110,482 | 8/1978 | Sato | 425/373 |
| 4,842,879 | 6/1989 | Ek | 426/501 |
| 4,961,949 | 10/1990 | Barnes et al. | 426/500 |

*Primary Examiner*—George Yeung
*Attorney, Agent, or Firm*—Limbach & Limbach L.L.P.

[57] ABSTRACT

A sheet of dough is wound up by a roller and a pressing device. The roller is located above a conveyor that conveys a sheet of dough. The pressing device is located near the roller. When the roller is winding up the sheet of dough, the pressing device moves to the roll of the sheet, so that the pressing device presses the wound-up sheet. Then, the pressing device moves away from it. This is repeated, so that the sheet is repeatedly pressed and thus tightly wound up.

7 Claims, 3 Drawing Sheets

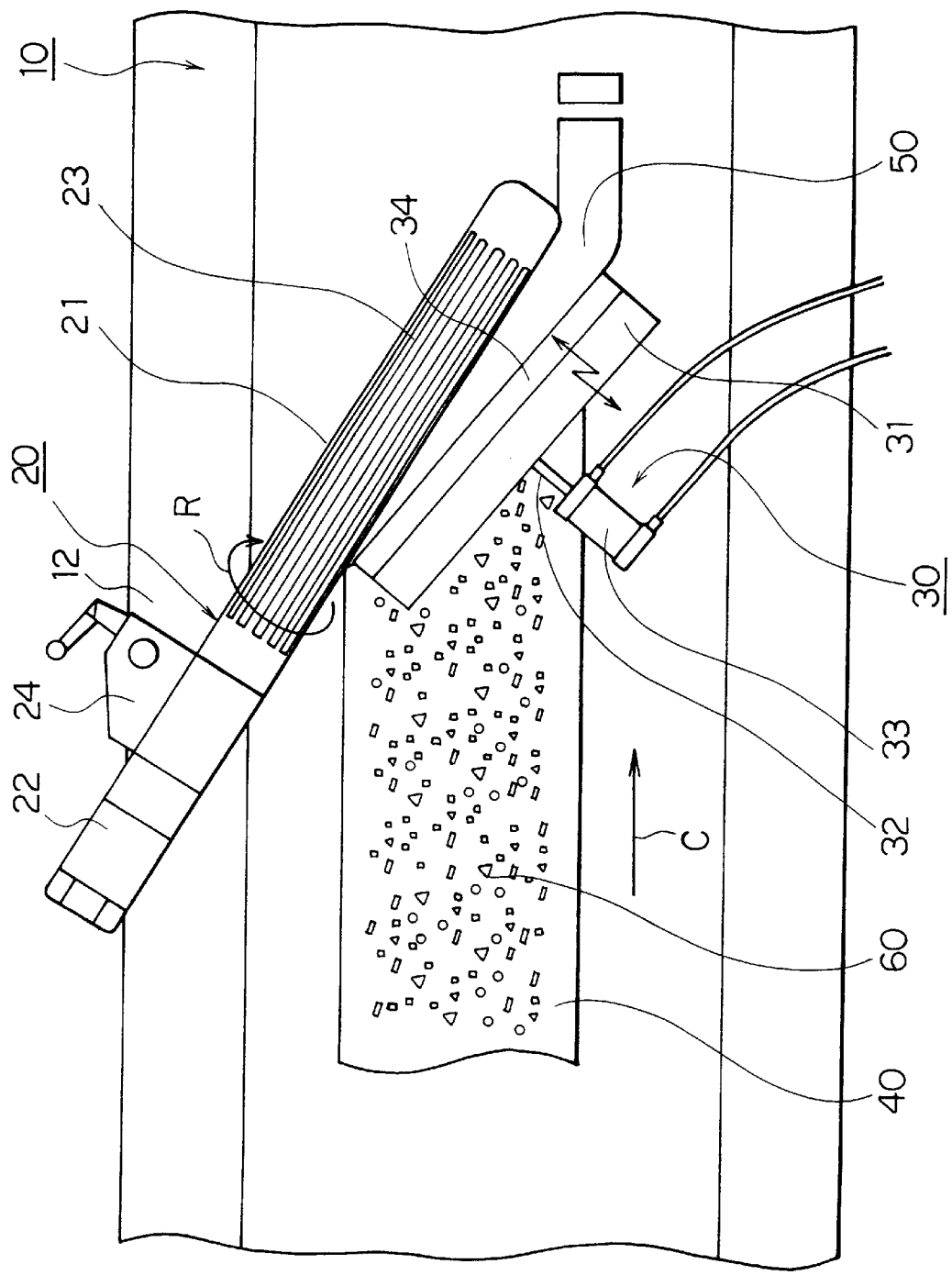

METHOD AND APPARATUS FOR WINDING UP A SHEET OF DOUGH

BACKGROUND OF THE INVENTION

1. Field of the Invention

This invention relates to a method and apparatus for manufacturing various kinds of bar-shaped and wound-up products (having concentric sections) made of bread dough, pie dough, dough for Danish pastry, etc.

2. Prior Art

A conventional apparatus that manufactured wound-up products is disclosed in a publication entitled *A Collection of Well-known Art*, published Feb. 20, 1980, by the Japanese Patent Office. The apparatus had a roller, called a sidewinder, to wind up a sheet of dough that is continuously fed, when the roller rotates. Also, in some cases this apparatus had some members that were able to assist the sidewinder to wind up the continuous sheet of dough.

Under some situations, the conventional apparatus could not tightly wind up a sheet of dough, when wound-up products were prepared. For example, when granulated sugar, jam, cream, etc. was applied on one or both sides of a sheet of dough, it was or they were slippery. The sheet of dough slipped off the roller of the conventional apparatus when the roller wound up the sheet, so that the roller could not help loosely winding it up.

Also, when solid or granular pieces, such as chestnuts, strawberries, pieces of pineapples or apples, or sugar-glazed adzuki beans, were put on an upper surface of a sheet of dough or embedded in the sheet, these pieces prevented the sidewinder from tightly winding up the sheet of dough.

SUMMARY OF THE INVENTION

One object of this invention is to provide a method and apparatus to tightly wind up a sheet of dough without it slipping off the surface of the apparatus, even if the surface is slippery.

Another object of this invention is to provide a method and apparatus to tightly wind up a sheet of dough when solid or granular pieces, such as chestnuts, strawberries, pieces of pineapples or apples, or sugar-glazed adzuki beans, are put on the surface of the sheet of dough or embedded in the sheet.

Thus, this invention provides a method of winding up a sheet of dough with a roller and a pressing means. The roller is located above a conveyor means that conveys a sheet of dough. Also, the roller is obliquely located relative to the longitudinal direction of the conveyer means. When the sheet of dough is conveyed by the conveyor means to the roller, the roller begins winding up the sheet of dough from one of the edges of it. The pressing means is located near the roller. When the roller winds up the sheet of dough, the pressing means moves to the sheet that is being wound up, so that the pressing means presses the wound-up sheet. Then, the pressing means moves away from it. This is repeated, so that the sheet is repeatedly pressed and thus tightly wound up.

One aspect of this invention provides a method for winding up a sheet of dough to prepare a wound-up product comprising steps for winding up a sheet of dough from one of the edges of the sheet in the longitudinal direction of it, moving a pressing means forward to press a roll that is being wound up, moving the pressing means backward and away from the roll, and repeating the forward and backward movements.

Another aspect of this invention provides an apparatus for winding up a sheet of dough to prepare a wound-up product comprising a conveyor means to convey a sheet of dough, a wind-up means located above the conveyor means to wind up the sheet of dough to form a roll, and a pressing means located near the winding-up means, where said pressing means moves toward the winding-up means to press the roll that is being wound up, then moves away from the winding-up means, and repeats these movements.

The pressing means can include a pressing plate. The pressing plate can be positioned opposite the roller. The pressing plate of the pressing means can slope toward the conveying surface of the conveyor. The lower end of the pressing plate can contact the lower side of the roller.

BRIEF DESCRIPTION OF THE DRAWINGS

FIG. 5 is another plan view of the embodiment of this invention where a sheet of dough on which a filling is put is being wound up.

DETAILED DESCRIPTION OF A PREFERABLE EMBODIMENT

Figure 1:
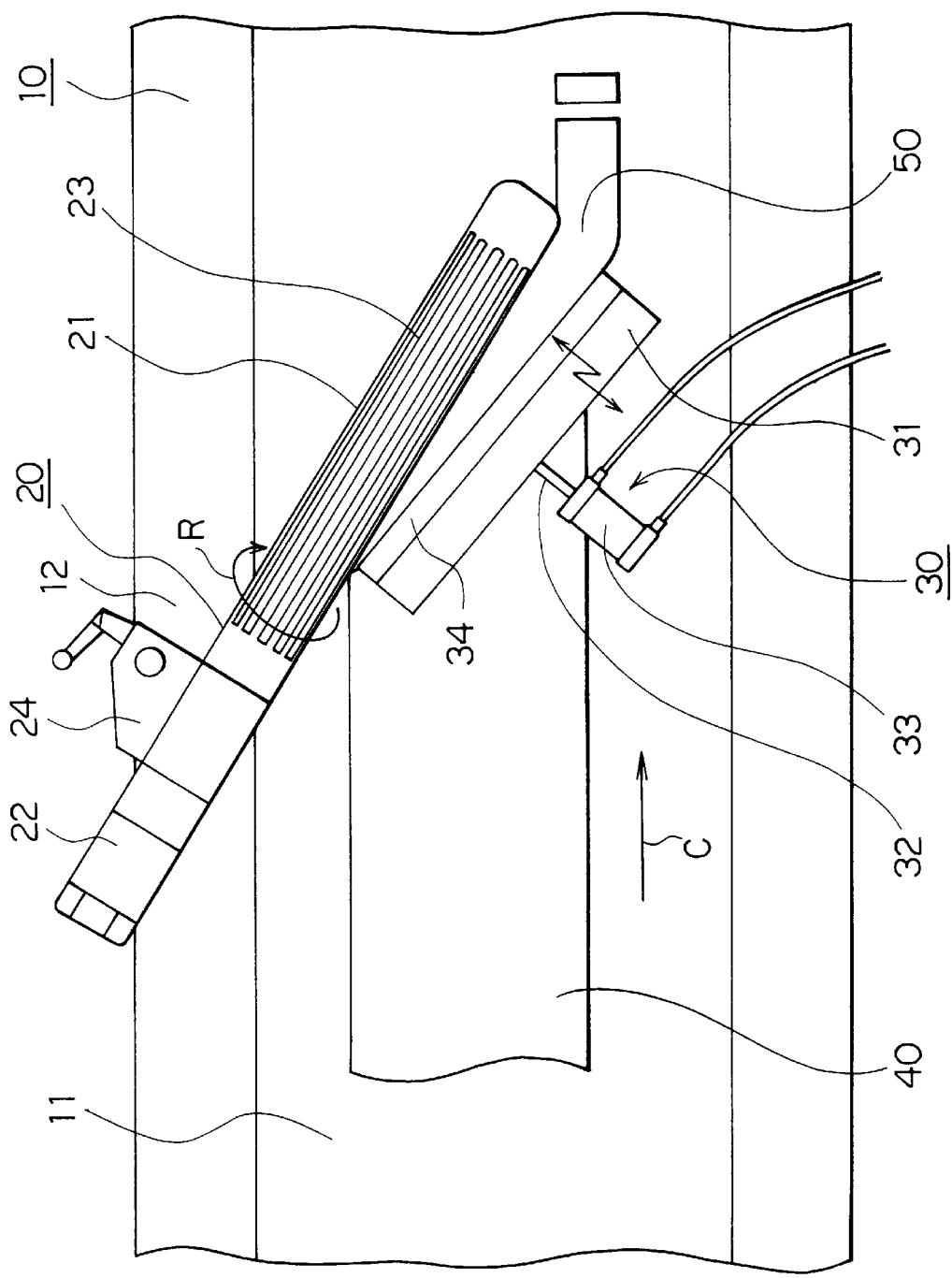
FIG. 1 is a plan view of an embodiment of this invention where a sheet of dough is being wound up.

FIG. 1 shows an embodiment of an apparatus for winding up a sheet of dough of this invention. It includes a conveyor 10, a wind-up apparatus 20, and a pressing apparatus 30. The conveyor 10 has a conveyor belt 11 and a frame 12. The conveyor 10 operates to feed a sheet of dough in the direction of the arrow C.

Figure 2:
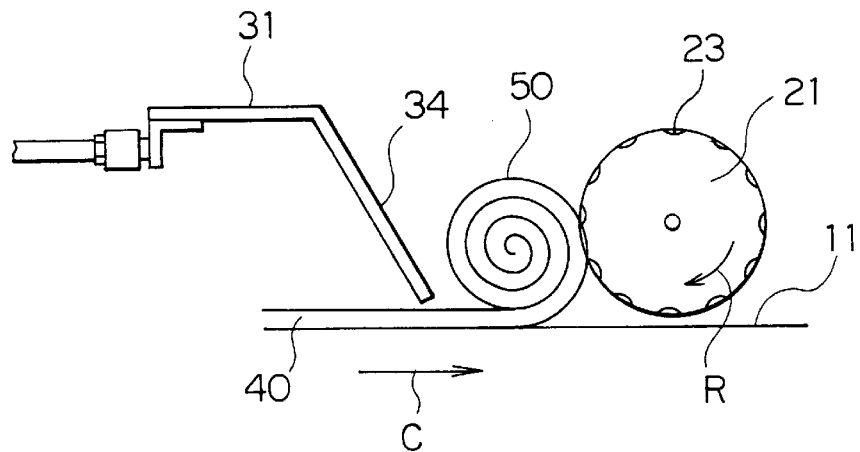
FIGS. 2, 3, and 4 are side views of a pressing plate of the embodiment of this invention, explaining the pressing function of it.

The wind-up apparatus 20 has a roller 21. It is fixed to the frame 12 through a fixing arm 24 such that the roller 21 is obliquely positioned relative to the longitudinal direction of the conveyor belt 11. This angle of the roller can be changed. A motor 22 is connected to the roller 21 to drive it. The frame 12 also supports the motor 22. On the surface of the roller 21 recesses 23 are formed along the longitudinal direction of it, so that the roller can engage a sheet of dough when it is wound up. The roller 21 does not contact the conveyor belt 11. Also, the roller 21 is horizontally supported parallel to the conveyor belt 11 to keep a gap between the roller and the conveyor belt. A sheet of dough 40 cannot pass through the gap. The roller 21 rotates opposite to the advancing direction of the conveyor belt 11 (FIG. 2).

Figure 3:
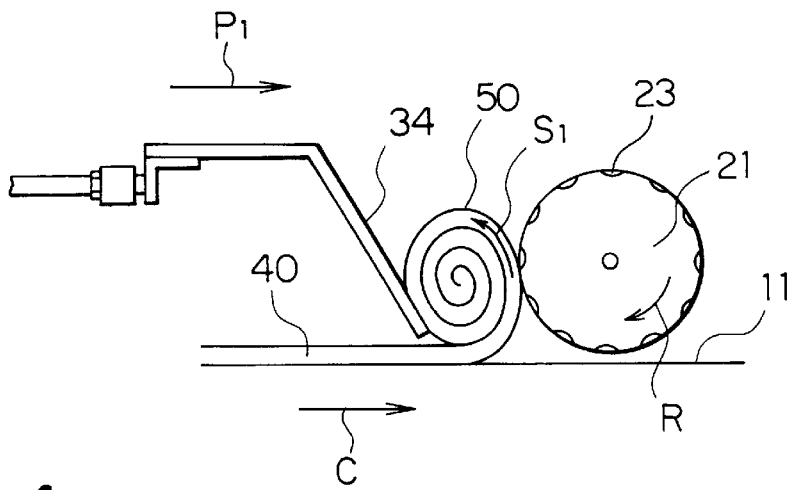
Figure 4:
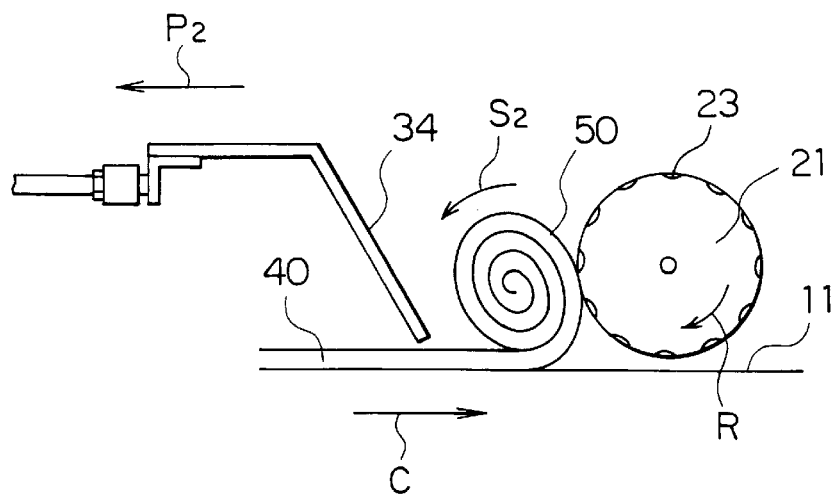

The pressing apparatus 30 has a pressing plate 31 and a motor 33. They are connected to each other by an arm 32. The pressing plate 31 is horizontally supported. It includes a pressing part 34, which slopes toward the surface of the conveyor belt 11 (FIGS. 2, 3, and 4). The lower end of the pressing part 34 is supported near the upper surface of the dough that is being fed by the conveyor belt 11, and does not contact it.

The pressing plate 31 has a horizontal length that is substantially the same as that of the part of the roller 21 that contacts the sheet of dough. The pressing part 34 is opposite the side surface of the roller 21. The pressing plate 31 has a pressing part 34. The motor 33 drives the pressing plate 31 to frequently and reciprocally move it horizontally. Thus, the pressing plate 31 approaches or moves away from the roller 21. This approach and retraction of the plate are alternately repeated. The motor 33 is an electric motor. But, instead of it, an air motor, etc. can be used.

In operation, the sheet 40 of dough is stretched by a stretcher (not shown), and then is fed by the conveyor belt 11 in the direction of the arrow C in FIG. 1. As in FIGS. 1, 2, 3, and 4, the roller 21 rotates in the direction of the arrow R. The roller 21 winds up one end of the sheet 40 of dough, when the end abuts against this roller. When the sheet is being wound up, it is formed to be a roll 50. As the sheet is wound up, the diameter of the roll increases. The roll that is being wound up can have an 80-mm or larger diameter.

When the roller 21 is winding up the sheet 40 of dough, as in FIG. 3 the pressing plate 31 approaches the roller 21. Then, the pressing part 34 contacts the roll 50. Since the pressing part 34 slopes toward the surface of the conveyor belt 11, the lower part of the pressing part 34 contacts the lower side of the roll 50. The pressing part 34 still advances to push the roll 50 to the roller 21. Simultaneously, the roll 50 is rotated by the roller in the direction of the arrow S1, as in FIG. 3. As a result, the roll 50 is deformed by both the roller 21 and the pressing plate 34 to a shape whose cross section is somewhat oval. Also, the area of the surface of roller 21 that contacts the roll 50 increases, so that the friction between them increases. The friction ensures that the roller 21 winds up the sheet 40 around the roll 50 without it slipping off the roll.

Then, the pressing part 34 moves away from the roll 50. As a result, the roll 50 falls down on a flat part of the sheet 40, since the roll is deformed to be oval. That is, because the roll 50 is deformed to have a longitudinal axis in a vertical plane, the roll 50 is easily rotated in the direction of the arrow S2, as in FIG. 4. Thus, the sheet 40 can be more easily wound up.

Then, again the pressing plate 31 approaches the roller 21 to press the roll 50, and then the pressing plate 31 moves away from it. This approach and retraction are repeated when the roller is winding the sheet up to prepare a wound-up product. Thus, the pressing part 34 frequently presses the roll when it is being wound up.

As stated above, the lower part of the pressing part 34 contacts and presses the lower side of the roll 50, since the pressing part 34 slopes toward the conveying surface of the conveyor belt 11. Thus, the pressing part 34 does not prevent the roll 50 from being rotated in the direction of the arrow S1 as in FIG. 3. Rather, the roll can easily be rotated around its lower side, since the lower part of the pressing part 34 holds the lower side of it.

As the diameter of the roll 50 increases as it is wound up, the contact area of the roller 21 to the surface of the roll increases. As a result, the friction between them increases, so that the roller 21 can tightly wind the roll up. Thus, even if the roll has a large diameter when it is being wound up, it does not collapse.

The pressing part 34 of the pressing apparatus 30 is not limited to a plate. Instead of it, a roller may be used. It must be parallel to the roller. Also, a plurality of rollers may be used. They must also be parallel to the roller 21. The roller and the rollers are located to repeatedly move to and away from the roll that is being wound up, so that the roll is repeatedly pressed when it is being wound up.

FIG. 5 shows the apparatus for winding up a sheet of dough of this invention that is the same as that in FIG. 1. However, unlike the case in FIG. 1, a filling 60 is put on the sheet 40 of dough. As the filling 60, solid or granular pieces, such as chestnuts, strawberries, pieces of pineapples or apples, or sugar-glazed adzuki beans, are used. They can be put on the upper surface of the sheet 40 of dough, after it is stretched by a stretcher (not shown), or embedded in the sheet before or after it is stretched. This apparatus winds up such a sheet to produce a wound-up product. By the conventional apparatus these pieces cause the roller to slip out of a roll of sheet of dough to be wound up. However, this apparatus allows the pressing plate to press the roll of a sheet of dough that is being wound up, so that the friction between the roll and the roller increases. As a result, the sheet can be tightly wound up.

This invention provides the following effects:

The pressing means of this invention presses the side of the roll that is being wound up. As a result, the roll is deformed to be oval. Thus, the contact area of the roller to the roll increases, so that the friction between them increases. The friction ensures that the roller rotates the roll.

The pressure caused by the pressing means results in the deformation of the cross section of the roll to a vertical oval. Thus, the roll can easily fall on a flat part of the sheet, so that the wind-up operation of the roller can be expedited.

Also, even if the roll that is being wound up has a large diameter, for example, one of 80 mm, the roll does not collapse, and maintains its shape.

Even if granulated sugar, jam, cream, oil, paste, etc. is applied on one or both sides of a sheet of dough, so that the side or sides is or are slippery, a sheet of dough can be tightly wound up.

Also, even if solid or granular pieces, such as chestnuts, strawberries, pieces of pineapples or apples, or sugar-glazed adzuki beans, are put on an upper surface of a sheet of dough or into the sheet, the roller can tightly wind up the sheet of dough without the roller slipping off the sheet.

We claim:

1. A method for winding up a sheet of dough to prepare a wound-up product comprising the steps of winding up a sheet of dough from one of the edges of the sheet in the longitudinal direction of it, moving a pressing means forward to press a roll that is being wound up, moving the pressing means backward and away from the roll, and repeating the forward and backward movements.

2. The method of claim 1 further including a step of putting a filling on the sheet of dough before it is wound up.

3. An apparatus for winding up a sheet of dough to prepare a wound-up product comprising a conveyor means (10) to convey a sheet of dough, a wind-up means (20) located above the conveyor means (10) to wind up the sheet of dough to form a roll, and a pressing means (30) located near the winding-up means (20), wherein said pressing means (30) moves toward the winding-up means (20) to press the roll that is being wound up, the pressing means (30) then moves away from the winding-up means, and the pressing means (30) repeats the movements.

4. The apparatus of claim 3 wherein the pressing means 30 includes a pressing plate.

5. The apparatus of claim 4 wherein the pressing plate is positioned opposite the roller.

6. The apparatus of claim 4 wherein the pressing plate of the pressing means slopes toward the conveying surface of the conveyor.

7. The apparatus of claim 3 wherein the lower end of the pressing plate contacts the lower side of the roller.

* * * * *